United States Patent
Kanjirathinkal et al.

(10) Patent No.: US 11,169,716 B2
(45) Date of Patent: Nov. 9, 2021

(54) PREDICTION OF MAINTENANCE WINDOW OF A STORAGE SYSTEM

(71) Applicant: EMC IP Holding Company LLC, Hopkinton, MA (US)

(72) Inventors: Joseph G. Kanjirathinkal, Cary, NC (US); Sanjib Mallick, Bangalore (IN); Peniel Charles, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/835,426

(22) Filed: Mar. 31, 2020

(65) Prior Publication Data
US 2021/0303177 A1    Sep. 30, 2021

(51) Int. Cl.
*G06F 3/06* (2006.01)
*G06F 12/00* (2006.01)
*G06F 13/00* (2006.01)

(52) U.S. Cl.
CPC ........... *G06F 3/0619* (2013.01); *G06F 3/067* (2013.01); *G06F 3/0611* (2013.01); *G06F 3/0644* (2013.01); *G06F 3/0653* (2013.01); *G06F 3/0683* (2013.01)

(58) Field of Classification Search
USPC ....................................................... 711/154
See application file for complete search history.

(56) References Cited

U.S. PATENT DOCUMENTS

| | | | | |
|---|---|---|---|---|
| 8,122,158 B1* | 2/2012 | Kudva | ................. | G06F 3/0613 710/7 |
| 9,703,664 B1* | 7/2017 | Alshawabkeh | ......... | G06F 3/061 |
| 10,282,107 B1* | 5/2019 | Martin | ................. | G06F 3/0611 |
| 10,719,245 B1* | 7/2020 | Gudipati | ............... | G06F 3/0689 |
| 10,809,931 B1* | 10/2020 | Martin | ................. | G06F 3/0689 |
| 10,909,073 B2* | 2/2021 | Wolfson | ................. | G06F 3/067 |
| 2011/0231580 A1* | 9/2011 | Nakamichi | ........... | G06F 3/0605 710/9 |

(Continued)

OTHER PUBLICATIONS

Dell EMC, "CloudIQ Detailed Review: A Proactive Monitoring and Analytics Application for Dell EMC Storage Systems," Technical White Paper, Jan. 2019, 42 pages.

(Continued)

*Primary Examiner* — Mohamed M Gebril
(74) *Attorney, Agent, or Firm* — Ryan, Mason & Lewis, LLP

(57) ABSTRACT

A method in one embodiment comprises detecting one or more storage arrays in an information technology infrastructure, and receiving input-output (IO) operation performance data recorded over a given time period from the one or more storage arrays. The performance data comprises a plurality of IO operation counts, each IO operation count comprising a number of IO operations per time unit for a component of a given storage array. The method also includes analyzing metadata for the IO operation counts to generate a time series comprising the IO operation counts sorted over a plurality of ordered time intervals of the given time period, and identifying a plurality of time blocks within the time series, each of the time blocks comprising a subset of the ordered time intervals. A proposed time interval for performance of a planned maintenance activity is generated based on one or more of the time blocks.

20 Claims, 5 Drawing Sheets

(56) References Cited

U.S. PATENT DOCUMENTS

| | | | | |
|---|---|---|---|---|
| 2012/0317358 | A1* | 12/2012 | Ando | G06F 3/0605 |
| | | | | 711/117 |
| 2013/0179648 | A1* | 7/2013 | Yagame | G06F 3/0604 |
| | | | | 711/156 |
| 2013/0318022 | A1* | 11/2013 | Yadav | G06Q 10/00 |
| | | | | 706/46 |
| 2015/0199139 | A1* | 7/2015 | Faulkner | G06F 11/3034 |
| | | | | 711/114 |
| 2016/0062658 | A1* | 3/2016 | Urata | G06F 3/0604 |
| | | | | 711/114 |
| 2016/0103764 | A1* | 4/2016 | Banerjee | G06F 12/084 |
| | | | | 711/129 |
| 2018/0285090 | A1* | 10/2018 | Das | G06F 8/65 |
| 2019/0266056 | A1* | 8/2019 | Wu | G06F 9/4887 |
| 2020/0026428 | A1* | 1/2020 | Vithalkar | G06F 3/0664 |
| 2020/0034718 | A1* | 1/2020 | Beedu | G06F 3/065 |
| 2020/0145299 | A1* | 5/2020 | Do | H04L 41/082 |

OTHER PUBLICATIONS

Tech 21 Century, "Sequential vs. Random Access Drives and Files," https://www.tech21century.com/sequential-vs-random-access-drives/, Mar. 10, 2020, 8 pages.

Sandisk, "Difference between Sequential and Random Access Operations," https://kb.sandisk.com/app/answers/detail/a_id/8150/~/difference-between-sequential-and-random-access-operations, Mar. 10, 2020, 1 page.

Wikipedia, "IOPS," https://en.wikipedia.org/wiki/IOPS, Mar. 5, 2020, 6 pages.

Wikipedia, "Regression Analysis," https://en.wikipedia.org/wiki/Regression_analysis, Mar. 3, 2020, 12 pages.

Wikipedia, "Time Series," https://en.wikipedia.org/wiki/Time_series, Mar. 4, 2020, 13 pages.

* cited by examiner

PREDICTION OF MAINTENANCE WINDOW OF A STORAGE SYSTEM

FIELD

The field relates generally to information processing systems, and more particularly to maintenance of storage systems.

BACKGROUND

Storage arrays in an information technology (IT) infrastructure undergo planned maintenance activities such as, for example, non-disruptive or disruptive upgrades, faulty part replacements, disaster recovery drills and other activities that affect performance and/or require downtime of the storage systems. Each maintenance activity has some impact on a storage system, which can vary based on several factors, such as, for example, software capability, type of maintenance being performed, need for manual intervention (e.g., in the case of part replacement) and the number of affected components.

In general, based on normal operation, the duration of certain types of maintenance activities for storage systems can be ascertained. However, it is difficult to determine the time periods (windows) in which to perform the maintenance events that will have the least effect on the operation of the storage system. Conventional techniques rely on administrator perception and/or guesses regarding the best time for a storage system to have downtime for maintenance, and schedule maintenance events based on the perception and/or guesses. The perception and/or guesses may be incorrect, and the effects of wrong scheduling decisions can be problematic and costly to storage system clients and providers.

Accordingly, there is a need for a computer driven structure and process which is capable of accurately determining time periods for different types of maintenance across multiple storage systems.

SUMMARY

Illustrative embodiments in some implementations provide a processing platform configured to detect one or more storage arrays in an IT infrastructure, and monitor performance of the detected storage arrays for a designated period of time. Performance data includes, for example, a number of input/output (IO) operations for one or more components of the detected storage arrays over the period of time. In some embodiments, a time series of the performance data is generated to identify time intervals during the monitored time period when the array is least utilized, and a regression model is used to predict future performance data. Based on the identified time intervals, performance predictions and details of maintenance events, proposed time intervals in which to perform the maintenance on the one or more storage arrays are identified and provided to a user.

In one embodiment, an apparatus comprises a platform including one or more processing devices. The processing platform is configured to detect one or more storage arrays in an information technology infrastructure, and to receive input-output (IO) operation performance data recorded over a given time period from the one or more storage arrays. The IO operation performance data comprises a plurality of IO operation counts, each IO operation count comprising a number of IO operations per time unit for a component of a given storage array of the one or more storage arrays. The processing platform is also configured to receive a notification of at least one planned maintenance activity for the one or more storage arrays, and to analyze metadata for the plurality of IO operation counts to generate a time series comprising the plurality of IO operation counts sorted over a plurality of ordered time intervals of the given time period. In the method, a plurality of time blocks within the time series are identified, wherein each of the plurality of time blocks comprises a subset of the plurality of ordered time intervals. In addition, an IO operation count for each of the plurality of time blocks is computed, and one or more of the plurality of time blocks having IO operation counts less than a threshold are identified. The processing platform is further configured to generate a proposed time interval for performance of the at least one planned maintenance activity based on the identified one or more of the plurality of time blocks.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Examples of public clouds may include, but are not limited to, Amazon Web Services® (AWS), Google Compute Engine® (GCE), and Microsoft Azure® Services platforms. Thus, enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

Figure 1:
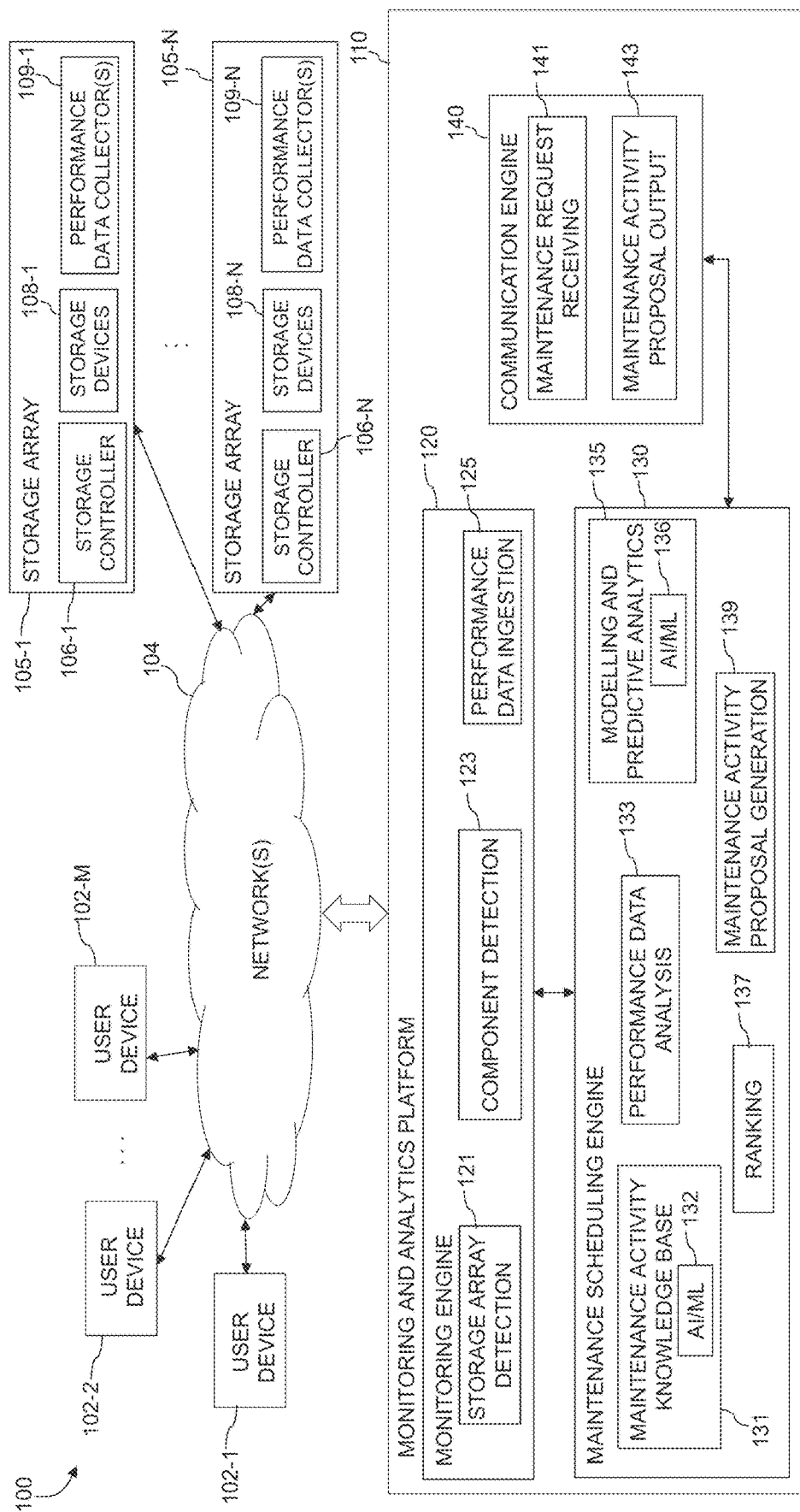
FIG. 1 is a block diagram of an information processing system comprising a monitoring and analytics platform configured for analyzing storage systems to schedule maintenance activities in an illustrative embodiment.

FIG. 1 shows an information processing system 100 configured in accordance with an illustrative embodiment. The information processing system 100 comprises user devices 102-1, 102-2, . . . 102-M (collectively "user devices 102"). The information processing system 100 further comprises one or more storage arrays 105-1, . . . 105-N (collectively "storage arrays 105"). The user devices 102 and storage arrays 105 communicate over a network 104 with a monitoring and analytics platform 110. The variable M and other similar index variables herein such as K, L and N are assumed to be arbitrary positive integers greater than or equal to two.

The user devices 102 can comprise, for example, desktop, laptop or tablet computers, mobile telephones, or other types of processing devices capable of communicating with the monitoring and analytics platform 110 over the network 104.

The term "user," "client" or "administrator" herein is intended to be broadly construed so as to encompass numerous arrangements of human, hardware, software or firmware entities, as well as combinations of such entities. At least a portion of the available services and functionalities provided by the monitoring and analytics platform 110 in some embodiments may be provided under Function-as-a-Service ("FaaS") and/or Platform-as-a-Service ("PaaS") models, including cloud-based FaaS and PaaS environments.

The monitoring and analytics platform 110 in the present embodiment is assumed to be accessible to the user devices 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage arrays 105 comprise respective sets of storage devices 108-1, . . . 108-N, collectively referred to herein as storage devices 108, coupled to respective storage controllers 106-1, . . . 106-N, collectively referred to herein as storage controllers 106. The storage arrays 105 further comprise respective sets of performance data collectors 109-1, . . . 109-N, collectively referred to herein as performance data collectors 109. According to an embodiment, the performance data collectors 109 comprise cache counters, which record counts for a number of IO operations (e.g., data read and/or data write operations) performed by particular components of respective storage arrays 105 in connection with data read and/or write requests received by a given storage array. For example, the performance data collectors 109 comprise one or more overall read IO counters, one or more overall write IO counters, and one or more overall total IO counters. An overall read IO counter records the number of IO operations for all read requests, for a particular component over a particular time period. An overall write IO counter records the number of IO operations for all write requests, for a particular component over a particular time period. An overall total IO counter records the number of IO operations for all read and write requests, for a particular component over a particular time period. As used herein "overall" refers to both sequential and random (also referred to as "non-sequential") IO operations, so that the overall IO counters record the number of sequential and non-sequential read and/or write operations for a particular component over a particular time period. Sequential IO operations read or write information from or to a file sequentially, starting from the beginning of the file, while random IO operations read or write information anywhere to or from a data file. In or more embodiments, the performance data collectors 109 may comprise dedicated sequential or random IO counters that record sequential or random IO operations (read or write operations).

In another example, the performance data collectors 109 utilize pages and subpages from which the number of IO operations for read and write requests corresponding to front emulations on directors can be retrieved for a particular time interval. The performance data collectors 109 are not necessarily limited to collecting counts of IO operations. Alternatively, or in addition, the performance data collectors 109 can collect data on bandwidth and/or latency for particular components over a particular time period.

Although illustratively shown as separate from the network 104 in the figure, at least portions of the storage arrays 105 may be considered part of the network 104 in some embodiments. For example, in embodiments in which the network 104 comprises at least one storage area network (SAN), the storage arrays 105 may be viewed as part of the one or more SANs.

The storage devices 108 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 108 include non-volatile random access memory (NVRAM), phase-change RAM (PC-RAM), magnetic RAM (MRAM), resistive RAM, spin torque transfer magneto-resistive RAM (STT-MRAM), and Intel Optane® devices based on 3D XPoint® memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, the storage arrays 105 illustratively comprise one or more VNX®, VMAX®, Unity™ or PowerMax™ storage arrays, commercially available from Dell EMC of Hopkinton, Mass.

As another example, the storage arrays 105 may comprise respective clustered storage systems, each including a plurality of storage nodes interconnected by one or more networks. An example of a clustered storage system of this type is an XtremIO™ storage array from Dell EMC, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

Communications between the user devices 102 and the storage arrays 105 or between the monitoring and analytics platform 110 and the storage arrays 105 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system such as an Amazon® Web Services (AWS®) system. Other examples of cloud-based systems that can be used to provide at least portions of the storage arrays 105 and possibly other portions of system 100 include Dell EMC® ECS, Google® Cloud Platform (GCP®) and Microsoft® Azure®.

As is apparent from the foregoing, terms such as "storage array" and "storage system" as used herein are intended to be broadly construed, and a given such storage array or storage system may encompass, for example, multiple distinct instances of a commercially-available storage array.

The storage devices 108 of the storage arrays 105 are configured to store data utilized by one or more applications running on one or more of the user devices 102 or other processing devices. According to an embodiment, the storage devices 108 on one of the storage arrays 105 are arranged in one or more storage pools. The storage arrays 105 and their corresponding storage devices 108 are examples of what are more generally referred to herein as "storage systems." The storage devices 108 of the storage arrays 105 implement logical units (LUNs) configured to store objects for users associated with the user devices 102 or other processing devices. These objects can comprise files, blocks or other types of objects.

The monitoring and analytics platform 110, on behalf of respective infrastructure tenants each corresponding to one or more users associated with respective ones of the user devices 102, implements a monitoring engine 120, a maintenance scheduling engine 130 and a communication engine 140 to provide users, clients and/or administrators with monitoring and analytics services including, for example, analyzing storage systems to schedule maintenance activities. More specifically, according to illustrative embodiments, the monitoring and analytics services include detecting the storage arrays in an IT infrastructure, and monitoring performance of the detected storage arrays over a period of time to determine the most reoccurring time periods during which the arrays are least utilized. From the most reoccurring time periods, the platform will recommend a time frame in which to perform one or more maintenance activities on the storage arrays. According to an embodiment, the IT infrastructure tenants are cloud infrastructure tenants.

Referring to FIG. 1, the monitoring and analytics platform 110 includes the monitoring engine 120, the maintenance scheduling engine 130, and the communication engine 140. The monitoring engine 120 includes a storage array detection module 121, a component detection module 123 and a performance data ingestion module 125. The maintenance scheduling engine 130 includes a maintenance activity knowledge base 131, a performance data analysis module 133, a modelling and predictive analytics module 135, a ranking module 137 and a maintenance activity proposal generation module 139. The communication engine 140 comprises a maintenance request receiving module 141 and a maintenance activity proposal output module 143.

The storage array detection module 121 detects the storage arrays 105 which are part of IT infrastructure, and extracts from the storage arrays 105 identifying information of each of the storage arrays 105. The identifying information comprises, for example, storage array name, storage array model, and storage array serial number. The identifying information may further comprise configuration information, such as, for example, software version, and when installed, last contact time (the last time the storage array data was sent to the monitoring and analytics platform 110), IP address, a physical location of the storage array 105, connectivity and capacity. Such identifying information can be compiled into a visualization and provided to a user to view on a graphical user interface (GUI) on one or more user devices 102. For example, the identifying information can be displayed in sortable columns for a common and simplified user experience across the GUI.

The component detection module 123 detects the components of and/or connected or corresponding to the storage arrays 105. The components can include, for example, storage pools, storage resource pools, virtual machines (VMs), drives, hosts, host bus arrays (HBAs), switch ports, servers, LUNs, volumes, and file systems (e.g., network file systems (NFSs) and virtual machine file systems (VMFSs)). Components can also include director boards comprising processors, physical memory, system interface boards (SIBS) and front and back-end ports. The component detection module 123 extracts from the components, identifying information of each of the components, which can include the same or similar identifying information described in connection with storage arrays 105, such as, for example, component name, model and serial number, as well as configuration information, such as, for example, software version and when installed, last contact time, IP address, physical location, connectivity and capacity. The identifying information can be compiled into a visualization and provided to a user to view on a GUI on one or more user devices 102.

The performance data ingestion module 125 retrieves performance data from the performance data collectors 109 of the storage arrays 105. For example, the performance data ingestion module 125 retrieves from the performance data collectors 109 counts of the number of IO operations (e.g., data read and/or data write operations) over a particular time period performed by particular components of respective storage arrays 105. For example, the performance data collectors 109 record TOPS (input-output operations per second) for a particular time period in connection with one or more components of a storage array 105. More specifically, the performance data collectors 109 record TOPS over a given time period (e.g., years, months, weeks, days) for one or more of storage pools, storage resource pools, VMs, drives, hosts, HBAs, switch ports, servers, LUNs, volumes, and file systems (e.g., NFSs VMFSs) corresponding to a given storage array 105, which are retrieved by the performance data ingestion modules 125. As noted herein, the IO operation counts (e.g., TOPS) may correspond to overall read and write operations corresponding to a component. For example, TOPS may be overall data read operations per second and overall data write operations per second.

According to an embodiment, the performance data ingestion module 125 organizes the IO counts according to component and/or storage array. The performance data ingestion module 125 is also configured to aggregate a plurality of IO counts corresponding to a plurality of components to generate aggregated IO counts for a combination of a plurality of the components, such as, for example, a plurality of functionally related or connected components, or all of the components of a particular storage array to calculate an IO count for an entire storage array.

As noted above, alternatively, or in addition, the performance data collectors 109 can collect data on bandwidth and/or latency for particular components over a particular time period. In this case, the performance data ingestion module 125 retrieves from the performance data collectors 109 latency and/or bandwidth information over a particular time period in connection with particular components of respective storage arrays 105. The performance data ingestion module 125 organizes the bandwidth and/or latency data according to component and/or storage array.

According to one or more embodiments, the performance data collectors 109 collect IO count, latency and/or bandwidth information of one or more components during performance of a maintenance activity, such as, for example, an upgrade (e.g., microcode or other software upgrade), part replacement or disaster recovery drill. As described further herein, the performance data, as well as data identifying the maintenance activity and the duration of the maintenance activity can be stored in a maintenance activity knowledge base 131 and analyzed in connection with scheduling of future maintenance activities of the same type and/or affecting the same or similar components of the storage arrays 105.

Data from monitoring engine 120, including storage array data, component data and performance data, is provided to the maintenance scheduling engine 130. According to an embodiment, the performance data analysis module 133 of the maintenance scheduling engine 130 processes IO operation performance data to compute an average number of IO operation counts from a plurality of IO operation counts and to identify IO operation counts corresponding to less than the average number of IO operation counts or a pre-configured threshold number of IO operation counts. As used herein, "average" can refer to any of various methods for computing a centralized or typical value, or close to centralized or typical value in a set of data, the methods including, but not necessarily limited to, mode, mode±a value (e.g., ±1), median, median±a value, mean, mean±a value or any other method or combination of methods for computing a centralized or typical value, or close to centralized or typical value in a set of data.

The performance data analysis module 133 further analyzes metadata (e.g., timestamps) for the identified one or more IO operation counts to determine one or more time intervals during the given time period corresponding to less than the threshold number of IO operation counts. For example, according to an embodiment, the performance data analysis module 133 retrieves captured TOPS values from the performance data collectors 109 from a given time period (e.g., the previous 6-months, previous month, previous two weeks, etc.), determines the lowest and highest TOPS values and computes an average TOPS value from the captured TOPS values. Using the average TOPS value as a threshold, the performance data analysis module 133 identifies the TOPS values below the average value. According to an embodiment, from which storage array(s) and respective components thereof the TOPS values are being used depends on the maintenance activity requested, and where that maintenance activity is to be performed. For example, in response to a requested maintenance activity to be performed on storage array 105-1, the performance data analysis module 133 may use IOPS values from storage devices 108-1 and their associated components to determine a time interval resulting in the lowest IOPS values for the storage devices 108-1 and their associated components.

In a non-limiting operational example, a user via one of the user devices 102 inputs a request for a maintenance activity, which is received and processed by maintenance request receiving module 141 of the communication engine 140. The request includes, for example, one or more of a maintenance activity identifier (ID), which is a unique identifier associated with that particular activity (e.g., unique code for the activity), a natural language description of the maintenance activity (e.g., code upgrade, remote data facility (RDF) drill), a projected time needed to complete the maintenance activity, a system disruption impact quantification of the maintenance activity, and a criticality quantification of the maintenance activity. The unique identifier and/or the natural language description may indicate which components and/or storage arrays are affected by the maintenance activity. The system disruption impact quantification and the criticality quantification of the maintenance activity may be expressed as, for example, high, medium and low (or similar terms), and may be pre-defined.

For example, high system disruption impact may indicate that a relatively high percentage (e.g., >50%) of components and/or arrays may be non-operational due to the maintenance activity, medium system disruption impact may indicate that a relatively mid-range percentage (e.g., 25% to 50%) of components and/or arrays may be non-operational due to the maintenance activity, and low system disruption impact may indicate that a relatively low percentage (e.g., <25%) of components and/or arrays may be non-operational due to the maintenance activity. In addition or alternatively, the level of impact is also based on how much the maintenance activity will lower the bandwidth, lower the throughput, and/or increase latency of an array and/or the components of the array. For example, a high impact maintenance activity will cause a relatively high decrease in bandwidth and/or throughput and a relatively high increase in latency, a medium impact maintenance activity will cause a relatively mid-range decrease in bandwidth and/or throughput and a relatively mid-range increase in latency, while a low impact maintenance activity will cause a relatively low decrease in bandwidth and/or throughput and a relatively low increase in latency of an array and/or the components of the array.

High criticality may indicate that the maintenance activity must be scheduled and commenced within a relatively short period of time (e.g., within 1 hour), medium criticality may indicate that the maintenance activity must be scheduled and commenced within a relatively mid-range period of time (e.g., within 24 hours), and low criticality may indicate that the maintenance activity must be scheduled and commenced within a longer period of time (e.g., within 2 weeks).

According to an embodiment, a user inputs, via a graphical user interface (GUI) on one of the user devices 102, one or more of the maintenance activity descriptors including the maintenance activity ID, the natural language description of the maintenance activity, the projected time needed to complete the maintenance activity, the system disruption impact quantification of the maintenance activity, and the criticality quantification of the maintenance activity. The maintenance activity request is generated based on the inputted maintenance activity descriptor, transmitted to the monitoring and analytics platform 110 via the network 104, and received by the maintenance request receiving module 141 of the communication engine 140.

If the user does not know or have one or more of the maintenance activity descriptors, the request is generated based on the provided maintenance activity descriptors and transmitted to the monitoring and analytics platform 110. Based on the provided maintenance activity descriptors, the maintenance activity knowledge base 131, which maintains a database storing different maintenance activities and their corresponding maintenance activity descriptors, attempts to match the requested maintenance activity with one or more of the maintenance activities in the knowledge base 131 to fill in the details of the requested maintenance activity that were lacking due to the omitted maintenance activity descriptors. The matching process is performed by searching for overlaps between the provided maintenance activity ID, the provided natural language description, the provided projected time to complete, and the provided system disruption impact and criticality quantifications with those in the knowledge base 131. For example, natural language processing (NLP) may be used to match the requested maintenance activity with a maintenance activity in the knowledge base 131. The maintenance activity knowledge base 131 may comprise, for example, an artificial intelligence/machine learning (AI/ML) engine 132, which uses one or more machine learning techniques, such as, for example, linear regression, neural networks, Support Vector Machine (SVMs), Multilayer Perceptrons (MLPs), deep learning models, decision trees and/or clustering to match the requested maintenance activity with one or more of the maintenance activities in the knowledge base 131, and fill in the details of the requested maintenance activity.

According to an embodiment, each maintenance activity in the knowledge base 131 details the maintenance activity, the corresponding effects of the maintenance activity with respect to bandwidth, throughput, latency and disrupting operation of one or more components, and the corresponding level of impact. Similarly, each maintenance activity in the knowledge base 131 details the maintenance activity, and the corresponding level of criticality. In addition, respective maintenance activities in the knowledge base 131 are related to a maintenance activity ID, a natural language description of the maintenance activity, a projected time needed to complete the maintenance activity, the system disruption impact quantification of the maintenance activity, and the criticality quantification of the maintenance activity.

Continuing with the non-limiting operational example, for purposes of explanation, it is assumed that the requested maintenance activity comprises a microcode or firmware upgrade for one or more components of a storage array that is projected to take 1 hour to complete, and must be performed within 1 week. Given the requested maintenance activity, the projected time to complete the activity, and the time within which to perform the activity, the performance data analysis module 133 performs a time series analysis of past IO operation activity for the one or more components of the storage array. For example, the performance data analysis module 133 analyzes IO counts for the one or more components of the storage array over a previous time period, such as, for example, 3-4 weeks, 2-3 months, etc. The analysis is based on the projected time to complete the activity. For example, based on a projected time to complete of 1 hour, the performance data analysis module 133 analyzes the IO counts (e.g., IOPS) from the previous time period in 1 hour windows (also referred to herein as "time blocks"), which may be divided into smaller time intervals (e.g., 15 minute time intervals). By way of further explanation, collected and received IO counts of the one or more components of the storage array (collected by the performance data collectors 109 and received by the performance data ingestion module 125) are processed into a time series at 15 minute time intervals over the previous time period (e.g., 3-4 weeks, 2-3 months, etc.), and IO counts of a plurality of 1 hour windows (time blocks) over the previous time period are computed. As used herein, an IO operation count (or IO count) of a window (or time block) can be computed in a number of ways, and may refer to, but is not necessarily limited to, a median IO operation count, a mode IO operation count, a mean IO operation count, a total IO operation count, and/or an actual IO operation count of the window (or time block), or other method or combinations of methods for computing an IO operation count (or IO count) of a window (or time block).

Figure 2:
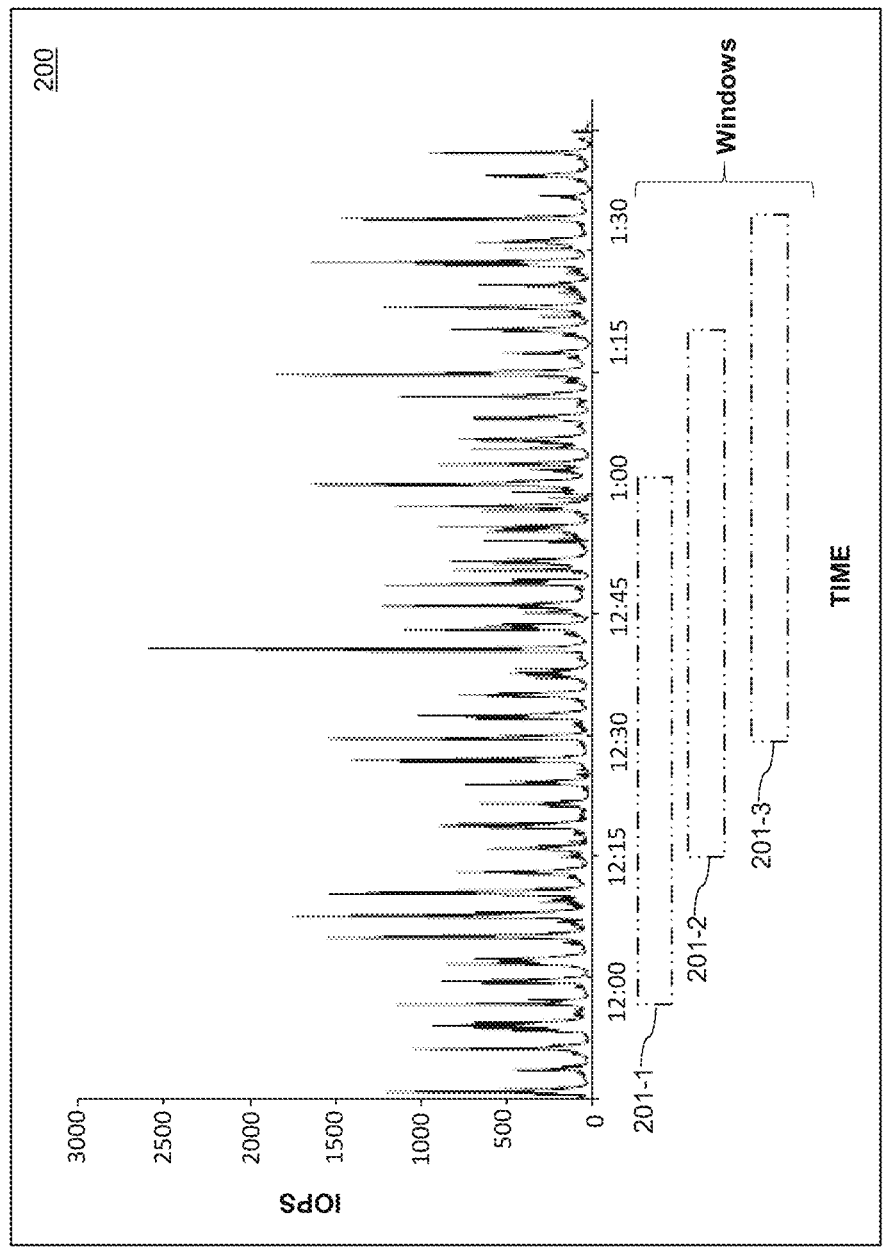
FIG. 2 illustrates a time series plot of a plurality of IO operation counts in an illustrative embodiment.

Referring, for example, to FIG. 2, which is a time series plot 200 of IOPS at 15 minute intervals, according to an embodiment, each window 201-1, 201-2 and 201-3 (collectively, windows 201) comprises the number of intervals adding up to the projected time to complete (e.g., in this example, four 15 minute intervals adding up to 1 hour). As seen by the staggered arrangement of the windows 201, the windows 201 are located across the time series at the time intervals (e.g. every 15 minute interval) where an IO count is computed for each window. The lowest IO counts of the plurality of windows are identified and ranked by the ranking module from lowest to highest IO count. A proposed time interval for performance of the requested maintenance activity is generated by the maintenance activity proposal generation module 139 based, at least in part, on windows with the lowest IO counts. The windows with the lowest IO counts represent the time intervals of the lowest usage of the one or more components of a storage array where the maintenance is to be performed. As noted above, the duration of each window is equal to a projected duration to complete the requested maintenance activity. In this way, the platform 110 is able to identify time blocks corresponding to the time to complete the maintenance that exhibit the lowest activity. As noted herein, although the activity in this case is measured in terms of IO counts, the embodiments are not necessarily limited thereto. For example, the performance data analysis module 133 may analyze other factors, such as, for example, bandwidth, throughput or latency to identify time blocks that exhibit the lowest activity.

The modelling and predictive analytics module 135 including an artificial intelligence/machine learning (AWL) engine 136, uses one or more machine learning techniques, such as, for example, linear regression, neural networks, SVMs, MLPs, deep learning models, decision trees and/or clustering, to generate a regression model to predict a plurality of future IO operation counts for the one or more storage arrays over a future time period. The regression model is based on an analysis of the past performance data by the performance data analysis module 133 to identify time blocks that have reoccurring features. For example, the performance data analysis module 133 compares the time blocks with the lowest IO counts to determine whether the time intervals have certain similarities, such as, for example, occurring at the same hour or minute on the same day of the week. For example, a first time block with low IOPS (e.g., below a threshold) may occur in a first week on a given day or days of the first week (e.g., Friday and/or Saturday) between the certain hours (e.g., 11:00 pm and 3:00 am), and a second time block also with low IOPS may occur in a second week on the same given day or days of the second week (e.g., Friday and/or Saturday) and between the same hours of 11:00 pm and 3:00 am as in the first week. In this case, given repeated occurrences of days and hours of low IOPS, the modelling and predictive analytics module 135 may determine that a future week will have the same days and hours of low IOPS in which a maintenance activity may be performed. In predicting a plurality of future IO operation counts for one or more storage arrays or components thereof over a future time period, the modelling and predictive analytics module 135 is configured to identify the IO operation counts of time blocks whose time intervals have the most overlapping features (e.g., month, day of week, hours, etc.), and predict the same or similar IO counts for future time blocks having the same overlapping features (e.g., month, day of week, hours, etc.).

According to one or more embodiments, a ranking module 137 ranks the time blocks of the generated time series according to: (i) a frequency of the reoccurring features in the subsets of the plurality of ordered time intervals; and/or (ii) the IO operation counts of the time blocks. For example, a relatively high frequency of reoccurring features among a particular plurality of time blocks having relatively low IO counts will be ranked higher than another particular plurality of time blocks having relatively high IO counts, and relatively lower frequencies of overlapping features. A low frequency of overlapped features may indicate that certain time periods of lower IO count may be random and not part of any pattern, while a high frequency of overlap may indicate a pattern that may be repeated in the future. The modelling and predictive analytics module 135 and the maintenance activity proposal generation module 139 consider the higher ranked time blocks before the lower ranked time blocks by when generating a time period proposal for a requested maintenance activity.

The performance and data analysis module 133 analyzes metadata for a plurality of IO operation counts to generate a time series comprising the plurality of IO operation counts sorted over a plurality of ordered time intervals of a given time period. In analyzing the metadata, the performance and data analysis module compares a plurality of timestamps for the plurality of IO operation counts by extracting from the plurality of timestamps respective portions of time data (e.g., minute, hour, day of week, numerical date, month and year) which have different levels of granularity.

As noted herein, the performance and data analysis module 133 identifies matching occurrences of the respective portions of the time data having the different levels of granularity between two or more of the plurality of timestamps to identify time blocks exhibiting similar IOPS behavior over the same or similar time periods. In this way, the modelling and predictive analytics 135 module can determine repeating periods with relatively low IOPS exhibiting a pattern over an extended time period (e.g., the same behavior at the same time each week), and from this identification of repeating periods, predict future similar time periods that will result in relatively low TOPS within which to perform a maintenance activity.

The maintenance activity proposal generation module 139 generates the proposed time interval for performance of the requested maintenance activity, which is at least based on the predicted future similar time periods, which are determined based on the ranked time blocks. Additional factors used by the maintenance activity proposal generation module 139 in connection with the generation of the proposed time interval for performance of the maintenance activity include, for example, projected time needed to complete the maintenance activity, a system disruption impact quantification of the maintenance activity, and a criticality quantification of the maintenance activity. For example, if the criticality indicates that the maintenance activity must be performed within the next 24 hours, and the time interval with the lowest IOPS is within 5-7 days, the maintenance activity proposal generation module 139 may propose a time interval for the maintenance activity that has the lowest TOPS of the time blocks within the next 24 hours instead of the time block with the overall lowest IOPS occurring within the next 5-7 days. In addition, a maintenance activity having a relatively low system impact may result in a proposed time interval having a higher IO operation count than other time intervals if competing factors such as criticality or required time to compete the maintenance dictate that the operation be performed within a certain time period. The factors considered by the maintenance activity proposal generation module 139 can be weighted giving importance to one or more of the factors over other factors.

As explained herein above, predicting the proposed time interval for performance of the requested maintenance activity factors in the projected duration to perform the maintenance activity to define a service window, and the criticality of when the maintenance activity needs to be performed. Based on the past IO performance data, the algorithm predicts IO load for the critical period in which the maintenance activity needs to be performed, and predicts the service windows having the lowest IO loads for the period in which the maintenance activity needs to be performed. As described herein, the predicted service windows are ranked based on one or more factors.

According to an embodiment, maintenance activities can be defined by elements including: (i) a service identifier identifying the type of maintenance activity; (ii) a criticality quantification of when maintenance activity needs to be performed (e.g., high—within 6 hours, medium—2 days, low—within 7 days); (iii) a duration of the time to perform and complete the maintenance activity; and (iv) an impact of the maintenance activity on the operation of the system (e.g., high system disruption, medium system disruption, impact, low system disruption), which can be based, for example, on the percentage of components that may be non-operational due to the maintenance activity. A request for a maintenance activity can indicate these elements, and different previously performed maintenance activities can be stored in the knowledge base 131 with the corresponding service identifier, criticality, duration and impact elements.

In a non-limiting illustrative example, a non-disruptive upgrade (NDU) of an array may correspond with a service time of 2 hours, a medium impact, and a low criticality. The knowledge base 131 includes matrices for each maintenance activity detailed in the above-described service identifier, criticality, duration and impact elements, or other combinations of elements used to describe a maintenance activity as described herein above.

According to an embodiment, the algorithm for generating such a maintenance activity matrix includes: (i) searching for the same or similar service identifiers in past maintenance activity records; (ii) calculating a median duration of the time to complete the maintenance activity based on previous maintenance activities determined to be the same or similar; (iii) determining the impact of the maintenance activity based on the previous maintenance activities; and (iv) determining the criticality of the maintenance activity based on the previous maintenance activities. Additional factors such as, for example, IO performance, states of impacted components and power consumption during the maintenance activity may also be added to the matrices.

The maintenance activity proposal output module 143 receives the proposed time interval or a plurality of proposed time intervals (which may be ranked) for performance of the maintenance from the maintenance activity proposal generation module 139, and transmits the proposed time interval or the plurality of proposed time intervals to a user via the network 104 so that the user can accept and/or select the interval during which the maintenance is to be performed, and allow the maintenance activity to proceed. A command can be generated from a user device 102, which is transmitted via the network 104 to a storage controller 106 of a storage array 105 to execute the maintenance activity based on the user's selection. Alternatively, based on a proposed time interval, a command for performance of the maintenance activity during the time interval is automatically generated and transmitted to one or more of the storage arrays 105 from the maintenance activity proposal output module 143. The command may be received by one of the storage controllers 106 and the maintenance activity automatically executed on the corresponding storage array 105 or one or more components thereof at the proposed time interval. If the maintenance activity requires human intervention, such as when a part requires replacement, a user can proceed with manual performance of the maintenance activity at the given time.

According to an embodiment, the maintenance activity proposal output module 143 can include a data visualization module. The data visualization module configures the proposed time interval and/or the plurality of proposed time intervals for performance of the maintenance activity for viewing by a user on a user interface of a user device 102. For example, the data visualization module organizes the data in an appropriate form for viewing on an application with an active interface (e.g., graphical user interface (GUI)) on the user devices 102. The data visualization module may further generate visualizations of the data in, for example, graphs, charts, heat maps, or other data visualization tools showing the distribution of projected IO operation counts over different time periods.

The knowledge base 131 and/or databases in some embodiments are implemented using one or more storage systems or devices associated with the monitoring and analytics platform 110. In some embodiments, one or more of the storage systems utilized to implement the knowledge base 131 and/or databases comprise one or more storage systems configured to store information relating to processing performed, data used, and to other functionality of the monitoring and analytics platform 110. Such storage systems can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system of monitoring and analytics platform 110 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO®, and scale-out NAS clusters comprising Isilon® platform nodes and associated accelerators, all from Dell EMC. Combinations of multiple ones of these and other storage products can also be used in implementing a given storage system in an illustrative embodiment.

The knowledge base 131 and/or databases may comprise a database service, such as, but not necessarily limited to GCE Cloud Storage, Microsoft Azure Blob (Binary Large Object) Storage, DynamoDB, MongoDB, Amazon Aurora and Oracle database.

Although shown as elements of the monitoring and analytics platform 110, the monitoring engine 120, the maintenance scheduling engine 130, and/or the communication engine 140 in other embodiments can be implemented at least in part externally to the monitoring and analytics platform 110, for example, as stand-alone servers, sets of servers or other types of systems coupled to the network 104. For example, the monitoring engine 120, the maintenance scheduling engine 130, and/or the communication engine 140 may be provided as cloud services accessible by the monitoring and analytics platform 110.

The monitoring engine 120, the maintenance scheduling engine 130, and/or the communication engine 140 in the FIG. 1 embodiment are each assumed to be implemented using at least one processing device. Each such processing device generally comprises at least one processor and an associated memory, and implements one or more functional modules for controlling certain features of the monitoring engine 120, the maintenance scheduling engine 130, and/or the communication engine 140.

At least portions of the monitoring and analytics platform 110 and the components thereof may be implemented at least in part in the form of software that is stored in memory and executed by a processor. The monitoring and analytics platform 110 and the components thereof comprise further hardware and software required for running the monitoring and analytics platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the monitoring engine 120, the maintenance scheduling engine 130, the communication engine 140 and other components of the monitoring and analytics platform 110 in the present embodiment are shown as part of the monitoring and analytics platform 110, at least a portion of the monitoring engine 120, the maintenance scheduling engine 130, the communication engine 140 and other components of the monitoring and analytics platform 110 in other embodiments may be implemented on one or more other processing platforms that are accessible to the monitoring and analytics platform 110 over one or more networks. Such components can each be implemented at least in part within another system element or at least in part utilizing one or more stand-alone components coupled to the network 104.

It is assumed that the monitoring and analytics platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the monitoring engine 120, the maintenance scheduling engine 130, the communication engine 140 and other components of the monitoring and analytics platform 110, and the elements thereof can each be implemented in the form of one or more LXCs running on one or more VMs. Other arrangements of one or more processing devices of a processing platform can be used to implement the monitoring engine 120, the maintenance scheduling engine 130 and the communication engine 140, as well as other components of the monitoring and analytics platform 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the monitoring and analytics platform 110 to reside in different data centers. Numerous other distributed implementations of the monitoring and analytics platform 110 are possible.

Accordingly, one or each of the monitoring engine 120, the maintenance scheduling engine 130, the communication engine 140 and other components of the monitoring and analytics platform 110 can each be implemented in a distributed manner so as to comprise a plurality of distributed components implemented on respective ones of a plurality of compute nodes of the monitoring and analytics platform 110.

It is to be appreciated that these and other features of illustrative embodiments are presented by way of example only, and should not be construed as limiting in any way.

Accordingly, different numbers, types and arrangements of system components such as the monitoring engine 120, the maintenance scheduling engine 130, the communication engine 140 and other components of the monitoring and analytics platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the monitoring and analytics platform 110 can be offered to cloud infrastructure customers or other users as part of FaaS, CaaS and/or PaaS offerings. The monitoring and analytics platform 110 in some embodiments may be implemented as part of a cloud infrastructure in the form of a cloud-based system such as an AWS system. Other examples of cloud-based systems that can be used to provide at least portions of the monitoring and analytics platform 110 and possibly other portions of system 100 include GCE, and Microsoft Azure®.

Figure 3:
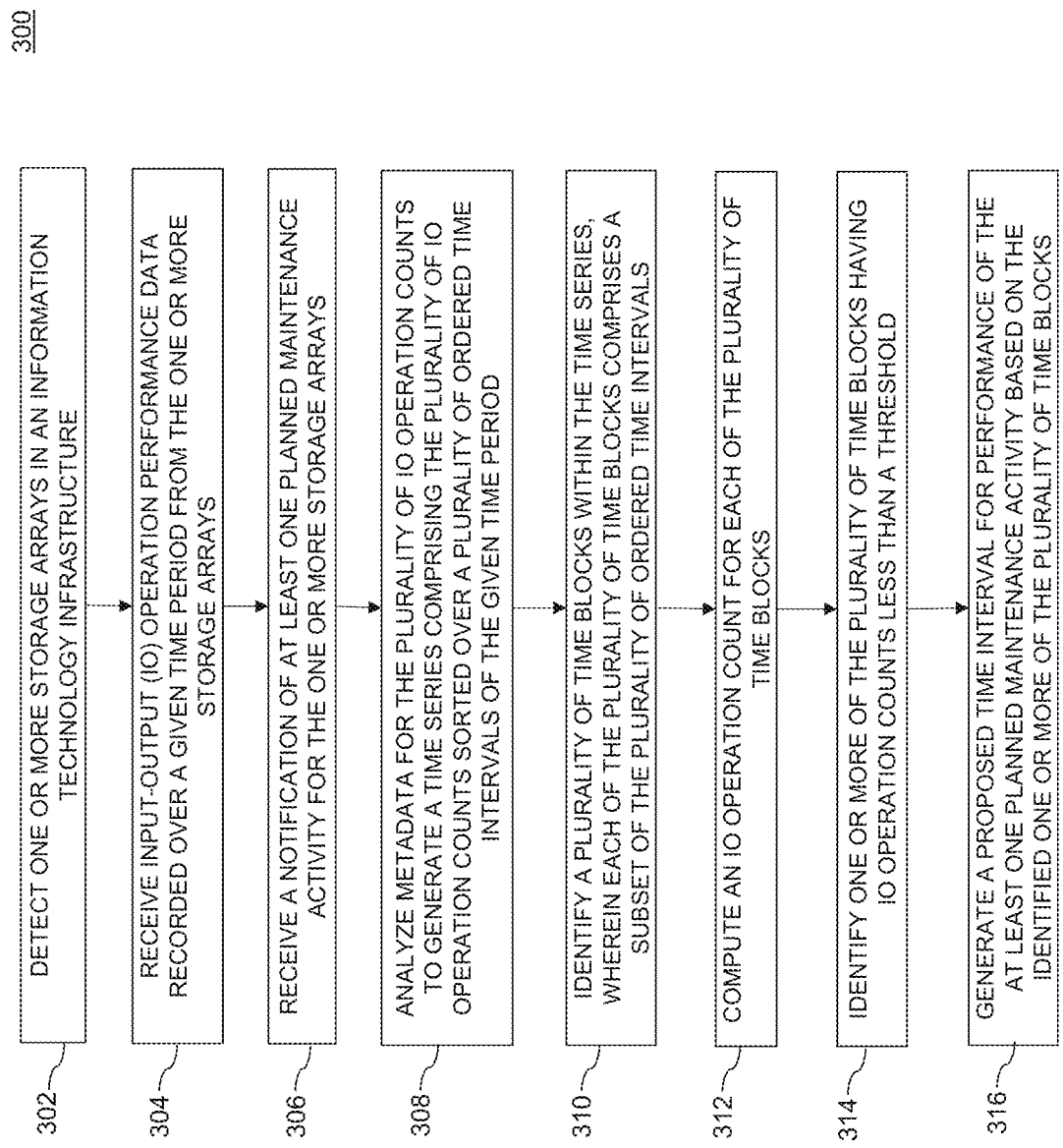
FIG. 3 is a flow diagram of a process for analyzing storage systems to schedule maintenance activities in an illustrative embodiment.

The operation of the information processing system 100 will now be described in further detail with reference to the flow diagram of FIG. 3. FIG. 3 is a flow diagram of a process for analyzing storage systems to schedule maintenance activities in an illustrative embodiment. With reference to FIG. 3, the process 300 as shown includes blocks 302-316, and is suitable for use in the system 100 but is more generally applicable to other types of information processing systems comprising a monitoring and analytics platform configured for analyzing storage systems to schedule maintenance activities.

At blocks 302 and 304 one or more storage arrays in an information technology infrastructure (e.g., storage arrays 105) are detected, and IO operation performance data recorded over a given time period is received from the one or more storage arrays. The storage array detection module 121 and the performance data ingestion module 125, for example, detect the storage arrays and receive the IO operation performance data. The IO operation performance data comprises a plurality of IO operation counts, each IO operation count comprising a number of IO operations per time unit (e.g., IOPS) for a component of a given storage array of the one or more storage arrays.

At block 306, a notification of at least one planned maintenance activity for the one or more storage arrays is received by, for example, the maintenance request receiving module 141. At block 308, metadata for the plurality of IO operation counts is analyzed to generate a time series comprising the plurality of IO operation counts sorted over a plurality of ordered time intervals of the given time period. At block 310, a plurality of time blocks within the time series are identified, wherein each of the plurality of time blocks comprises a subset of the plurality of ordered time intervals.

Analyzing the metadata includes comparing a plurality of timestamps for the plurality of IO operation counts, which comprises extracting from the plurality of timestamps respective portions of time data, the respective portions of the time data having different levels of granularity. According to an embodiment, the process further includes identifying matching occurrences of the respective portions of the time data having different levels of granularity between two or more of the plurality of timestamps to identify time blocks exhibiting similar TOPS behavior over the same or similar time periods. As a result, repeating periods with relatively low IOPS exhibiting a pattern over an extended time period (e.g., the same behavior at the same time each week) can be determined.

At block 312, an IO operation count for each of the plurality of time blocks is computed, and at block 314 one or more of the plurality of time blocks having IO operation counts less than a threshold are identified. As noted herein, an IO operation count of a window (or time block) can be computed in a number of ways, and may refer to, but is not necessarily limited to, a median IO operation count, a mode IO operation count, a mean IO operation count, a total IO operation count, and/or an actual IO operation count of the window (or time block), or other method or combinations of methods for computing an IO operation count (or IO count) of a window (or time block).

The process 300 further includes, at block 316, generating a proposed time interval for performance of the at least one planned maintenance activity based on the identified one or more of the plurality of time blocks.

The process may also include identifying a duration to complete the at least one planned maintenance activity, wherein a duration of each of the plurality of time blocks is equal to the duration to complete the at least one planned maintenance activity, and generating a regression model to predict a plurality of future IO operation counts for the one or more storage arrays over a future time period.

According to one or more embodiments, the identified one or more of the plurality of time blocks are compared to identify reoccurring features of the subsets of the plurality of ordered time intervals associated with each of the identified one or more of the plurality of time blocks. In addition, the identified one or more of the plurality of time blocks are ranked according to at least one of: (i) a frequency of the reoccurring features in the subsets of the plurality of ordered time intervals; and (ii) the IO operation counts of the one or more of the plurality of time blocks.

Machine learning techniques may be used to determine an impact on the one or more storage arrays of the at least one planned maintenance activity, and the generation of the proposed time interval for performance of the at least one planned maintenance activity may be further based on the determined impact of the at least one planned maintenance activity.

It is to be appreciated that the FIG. 3 process and other features and functionality described above can be adapted for use with other types of information systems configured to execute storage system analysis and maintenance activity scheduling services on a monitoring and analytics platform or other type of processing platform.

The particular processing operations and other system functionality described in conjunction with the flow diagram of FIG. 3 are therefore presented by way of illustrative example only, and should not be construed as limiting the scope of the disclosure in any way. Alternative embodiments can use other types of processing operations. For example, the ordering of the process blocks may be varied in other embodiments, or certain blocks may be performed at least in part concurrently with one another rather than serially. Also, one or more of the process blocks may be repeated periodically, or multiple instances of the process can be performed in parallel with one another.

Functionality such as that described in conjunction with the flow diagrams of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

In accordance with one or more embodiments, a platform and techniques are provided for identifying and proposing the best time frame to perform any maintenance activities on any storage arrays detected in an IT infrastructure. Maintenance activities include, but are not necessarily limited to, non-disruptive/disruptive upgrade of arrays, faulty part replacements, disaster recovery drills and any other activity that affects performance or require downtime of one or more arrays.

The platform and techniques detect all the storage arrays in an IT infrastructure, monitor performance of the detected storage arrays, and determine the most repeated time periods during which the arrays and/or components thereof are least utilized. From the most reoccurring least utilized time intervals observed, and based on a variety of factors, the platform and techniques identify the best or near to the best upcoming time frame for maintenance activities that may need to be performed on the storage arrays.

Illustrative embodiments of systems with the monitoring and analytics platform as disclosed herein can provide a number of significant advantages relative to conventional arrangements. For example, one or more embodiments are configured to address problems with current approaches for scheduling maintenance activities which are not able to analyzed performance data and based on such analysis, propose time frames for performance of maintenance, or automatically commence activities based on the determined time frames. Advantageously, the illustrative embodiments remove perception and guessing from the maintenance scheduling process, and provide for large scale analysis of multiple storage arrays of an IT infrastructure, and their components to determine time frames for maintenance activity that will have the lowest or nearly the lowest impact on the storage system. For example, the embodiments analyze performance data from multiple components that may be affected by a maintenance activity to determine periods of lowest activity, and factor in parameters such as time to complete the maintenance activity, the impact of the maintenance activity on the system and the criticality of the maintenance activity in order to identify and propose the best possible times for maintenance performance to a user. The embodiments also advantageously determine time frames for maintenance activities and automatically commence the maintenance activities in response to requests for the maintenance activities initiated by users.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the monitoring and analytics platform 110 or portions thereof are illustratively implemented for use by tenants of such a multi-tenant environment.

As mentioned previously, cloud infrastructure as disclosed herein can include cloud-based systems such as AWS, GCE and Microsoft Azure. Virtual machines provided in such systems can be used to implement at least portions of one or more of a computer system and a monitoring and analytics platform in illustrative embodiments. These and other cloud-based systems in illustrative embodiments can include object stores such as AWS S3, GCE Cloud Storage, and Microsoft Azure Blob Storage.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
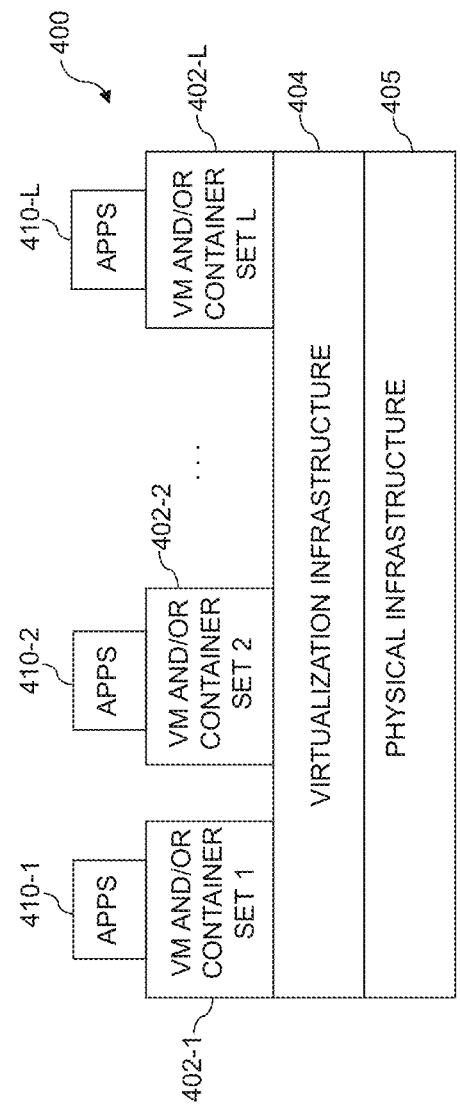
FIGS. 4 and 5 show examples of processing platforms that may be utilized to implement at least a portion of an information processing system in illustrative embodiments.
Figure 5:
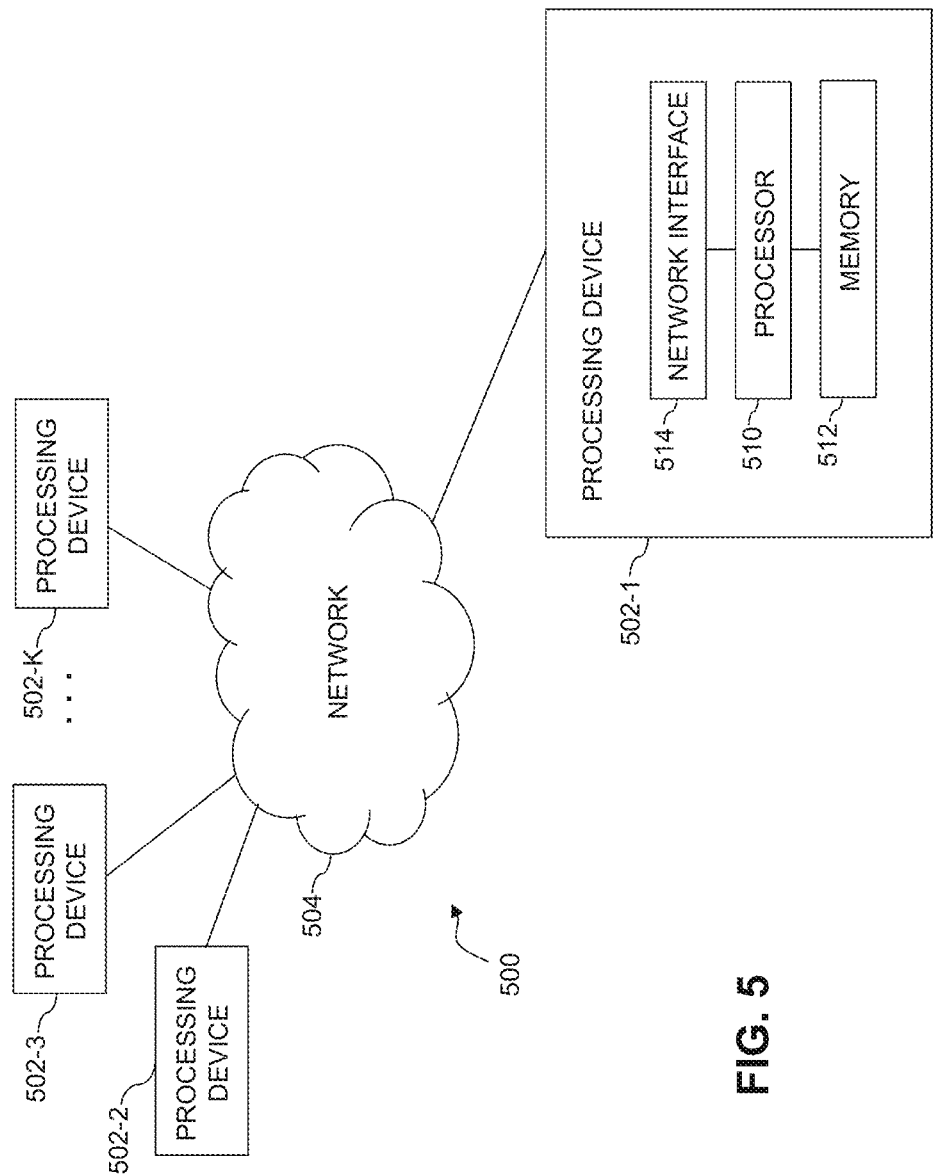

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide query processing functionality of the type described above for one or more processes running on a given one of the VMs. For example, each of the VMs can implement topology misconfiguration detection for one or more processes running on that particular VM.

An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can provide maintenance scheduling functionality of the type described above for one or more processes running on different ones of the containers. For example, a container host device supporting multiple containers of one or more container sets can implement one or more instances of storage system analysis and/or maintenance activity scheduling.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512. The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the monitoring and analytics platform 110 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and monitoring and analytics platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a processing platform comprising one or more processing devices, each of the one or more processing devices comprising a processor coupled to a memory;
said processing platform being configured:
to detect one or more storage arrays in an information technology infrastructure;
to receive input-output (IO) operation performance data recorded over a given time period from the one or more storage arrays;
wherein the IO operation performance data comprises a plurality of component-based IO operation counts, each component-based IO operation count comprising a number of IO operations per time unit for a component of a given storage array of the one or more storage arrays;
to receive a notification of at least one planned maintenance activity for the one or more storage arrays;
to analyze metadata for the plurality of component-based IO operation counts to generate a time series comprising the plurality of component-based IO operation counts sorted over a plurality of time intervals of the given time period;
wherein the plurality of time intervals are chronologically ordered over the given time period;
to identify a plurality of time blocks within the time series, wherein each of the plurality of time blocks comprises a portion of the given time period;
to compute a block-based IO operation count for each of the plurality of time blocks;
to identify a subset of the plurality of time blocks having block-based IO operation counts less than a threshold;
to analyze the identified subset of the plurality of time blocks to identify reoccurring features associated with respective time blocks of the identified subset of the plurality of time blocks;
wherein the identified reoccurring features comprise one or more matching time periods between two or more respective time blocks of the identified subset of the plurality of time blocks;
to rank the respective time blocks of the identified subset of the plurality of time blocks according to at least a combination of: (i) a frequency of their corresponding reoccurring features among the respective time blocks; and (ii) the block-based IO operation counts of the respective time blocks; and
to generate a proposed time interval for performance of the at least one planned maintenance activity based at least in part on the identified subset of the plurality of time blocks, the identified reoccurring features and the ranking of the respective time blocks of the identified subset of the plurality of time blocks;
wherein a first one of the respective time blocks having a first frequency of corresponding reoccurring features and a first block-based IO operation count is ranked higher for selection of the proposed time interval than a second one of the respective time blocks having a second frequency of corresponding reoccurring features and a second block-based IO operation count, the first frequency being higher than the second frequency and the first block-based IO operation count being lower than the second block-based IO operation count.

2. The apparatus of claim 1 wherein said processing platform is further configured to identify a duration to complete the at least one planned maintenance activity, wherein a duration of each of the plurality of time blocks is equal to the duration to complete the at least one planned maintenance activity.

3. The apparatus of claim 1 wherein a component of a given storage array comprises at least one of a storage pool, a storage resource pool, a virtual machine, a drive, a host, a host bus array, a switch port, a server, a logical unit, a volume, and a file system.

4. The apparatus of claim 1 wherein said processing platform is further configured to generate a regression model to predict a plurality of future component-based IO operation counts for the one or more storage arrays over a future time period.

5. The apparatus of claim 1 wherein the number of IO operations per time unit for the component comprise at least one of data read operations per second and data write operations per second.

6. The apparatus of claim 1 wherein, in analyzing the metadata, said processing platform is configured to compare a plurality of timestamps for the plurality of component-based IO operation counts.

7. The apparatus of claim 6 wherein, in comparing the plurality of timestamps, said processing platform is configured to extract from the plurality of timestamps respective portions of time data, the respective portions of the time data having different levels of granularity.

8. The apparatus of claim 7 wherein the one or more matching time periods comprise matching occurrences of the respective portions of the time data having the different levels of granularity between two or more of the plurality of timestamps.

9. The apparatus of claim 1 wherein said processing platform is further configured to maintain a knowledge base of impact data of a plurality of maintenance activities.

10. The apparatus of claim 1 wherein said processing platform is further configured to use machine learning techniques to determine an impact on the one or more storage arrays of the at least one planned maintenance activity, and wherein the generation of the proposed time interval for performance of the at least one planned maintenance activity is further based at least in part on the determined impact of the at least one planned maintenance activity.

11. A method comprising:
    detecting one or more storage arrays in an information technology infrastructure;
    receiving input-output (IO) operation performance data recorded over a given time period from the one or more storage arrays;
    wherein the IO operation performance data comprises a plurality of component-based IO operation counts, each component-based IO operation count comprising a number of IO operations per time unit for a component of a given storage array of the one or more storage arrays;
    receiving a notification of at least one planned maintenance activity for the one or more storage arrays;
    analyzing metadata for the plurality of component-based IO operation counts to generate a time series comprising the plurality of component-based IO operation counts sorted over a plurality of time intervals of the given time period;
    wherein the plurality of time intervals are chronologically ordered over the given time period;
    identifying a plurality of time blocks within the time series, wherein each of the plurality of time blocks comprises a portion of the given time period;
    computing a block-based IO operation count for each of the plurality of time blocks;
    identifying a subset of the plurality of time blocks having block-based IO operation counts less than a threshold;
    analyzing the identified subset of the plurality of time blocks to identify reoccurring features associated with respective time blocks of the identified subset of the plurality of time blocks;
    wherein the identified reoccurring features comprise one or more matching time periods between two or more respective time blocks of the identified subset of the plurality of time blocks;
    ranking the respective time blocks of the identified subset of the plurality of time blocks according to at least a combination of: (i) a frequency of their corresponding reoccurring features among the respective time blocks; and (ii) the block-based IO operation counts of the respective time blocks; and
    generating a proposed time interval for performance of the at least one planned maintenance activity based at least in part on the identified subset of the plurality of time blocks, the identified reoccurring features and the ranking of the respective time blocks of the identified subset of the plurality of time blocks;
    wherein a first one of the respective time blocks having a first frequency of corresponding reoccurring features and a first block-based IO operation count is ranked higher for selection of the proposed time interval than a second one of the respective time blocks having a second frequency of corresponding reoccurring features and a second block-based IO operation count, the first frequency being higher than the second frequency and the first block-based IO operation count being lower than the second block-based IO operation count; and
    wherein the method is performed by a processing platform comprising one or more of processing devices, each of the one or more of processing devices comprising a processor coupled to a memory.

12. The method of claim 11 wherein analyzing the metadata comprises comparing a plurality of timestamps for the plurality of component-based IO operation counts.

13. The method of claim 12 wherein comparing the plurality of timestamps comprises extracting from the plurality of timestamps respective portions of time data, the respective portions of the time data having different levels of granularity.

14. The method of claim 13 wherein the one or more matching time periods comprise matching occurrences of the respective portions of the time data having the different levels of granularity between two or more of the plurality of timestamps.

15. A computer program product comprising a non-transitory processor-readable storage medium having stored therein program code of one or more software programs, wherein the program code when executed by a processing platform causes said processing platform:
    to detect one or more storage arrays in an information technology infrastructure;
    to receive input-output (IO) operation performance data recorded over a given time period from the one or more storage arrays;
    wherein the IO operation performance data comprises a plurality of component-based IO operation counts, each component-based IO operation count comprising a number of IO operations per time unit for a component of a given storage array of the one or more storage arrays;
    to receive a notification of at least one planned maintenance activity for the one or more storage arrays;
    to analyze metadata for the plurality of component-based IO operation counts to generate a time series comprising the plurality of component-based IO operation counts sorted over a plurality of time intervals of the given time period;
    wherein the plurality of time intervals are chronologically ordered over the given time period;

to identify a plurality of time blocks within the time series, wherein each of the plurality of time blocks comprises a portion of the given time period;

to compute a block-based IO operation count for each of the plurality of time blocks;

to identify a subset of the plurality of time blocks having block-based IO operation counts less than a threshold;

to analyze the identified subset of the plurality of time blocks to identify reoccurring features associated with respective time blocks of the identified subset of the plurality of time blocks;

wherein the identified reoccurring features comprise one or more matching time periods between two or more respective time blocks of the identified subset of the plurality of time blocks;

to rank the respective time blocks of the identified subset of the plurality of time blocks according to at least a combination of: (i) a frequency of their corresponding reoccurring features among the respective time blocks; and (ii) the block-based IO operation counts of the respective time blocks; and to generate a proposed time interval for performance of the at least one planned maintenance activity based at least in part on the identified subset of the plurality of time blocks, the identified reoccurring features and the ranking of the respective time blocks of the identified subset of the plurality of time blocks;

wherein a first one of the respective time blocks having a first frequency of corresponding reoccurring features and a first block-based IO operation count is ranked higher for selection of the proposed time interval than a second one of the respective time blocks having a second frequency of corresponding reoccurring features and a second block-based IO operation count, the first frequency being higher than the second frequency and the first block-based IO operation count being lower than the second block-based IO operation count.

16. The computer program product of claim 15 wherein, in analyzing the metadata, the program code further causes said processing platform to compare a plurality of timestamps for the plurality of component-based IO operation counts.

17. The computer program product of claim 16 wherein, in comparing the plurality of timestamps, the program code further causes said processing platform to extract from the plurality of timestamps respective portions of time data, the respective portions of the time data having different levels of granularity.

18. The computer program product of claim 17 wherein the one or more matching time periods comprise matching occurrences of the respective portions of the time data having the different levels of granularity between two or more of the plurality of timestamps.

19. The computer program product of claim 15 wherein the program code further causes said processing platform to use machine learning techniques to determine an impact on the one or more storage arrays of the at least one planned maintenance activity, and wherein the generation of the proposed time interval for performance of the at least one planned maintenance activity is further based at least in part on the determined impact of the at least one planned maintenance activity.

20. The method of claim 11 further comprising using machine learning techniques to determine an impact on the one or more storage arrays of the at least one planned maintenance activity, wherein the generation of the proposed time interval for performance of the at least one planned maintenance activity is further based at least in part on the determined impact of the at least one planned maintenance activity.

* * * * *